A. G. CRIBARI.
TRACTOR.
APPLICATION FILED JUNE 16, 1920.

1,391,761.

Patented Sept. 27, 1921.
2 SHEETS—SHEET 1.

INVENTOR
Angelo G. Cribari
BY John A. Aarsmith
ATTORNEY

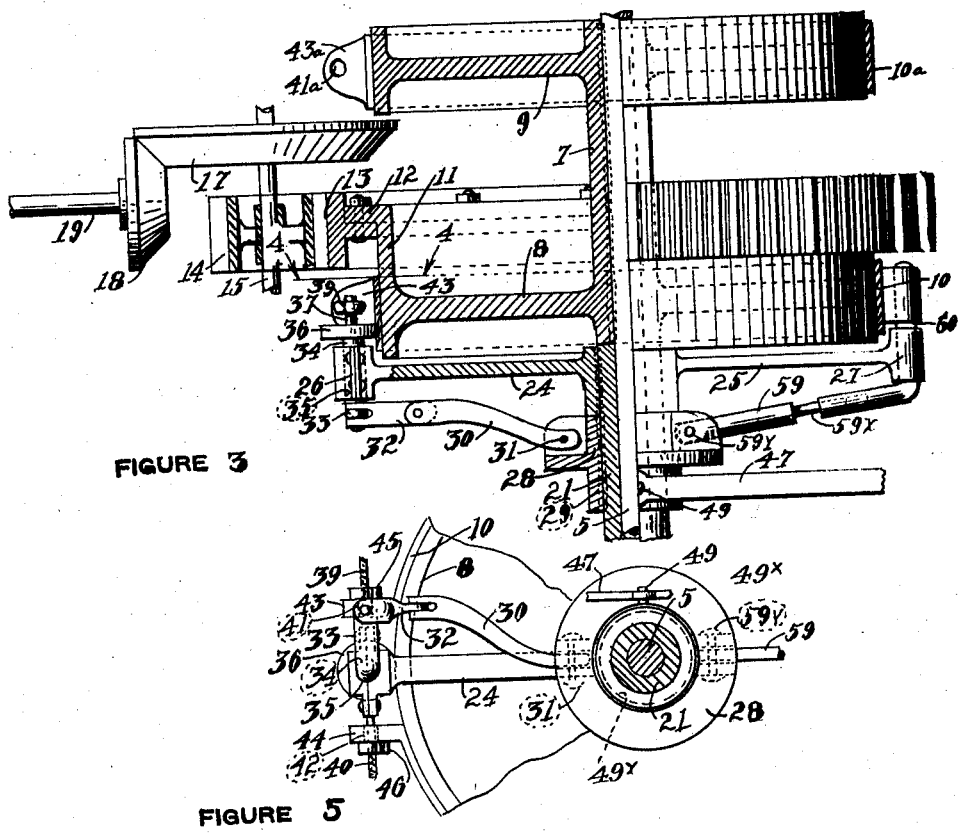

UNITED STATES PATENT OFFICE.

ANGELO G. CRIBARI, OF SAN BRUNO, CALIFORNIA.

TRACTOR.

1,391,761.  Specification of Letters Patent.  Patented Sept. 27, 1921.

Application filed June 16, 1920. Serial No. 389,419.

*To all whom it may concern:*

Be it known that I, ANGELO G. CRIBARI, a citizen of the United States, and resident of San Bruno, in the county of San Mateo and State of California, have invented certain new and useful Improvements in Tractors, of which the following is a specification.

My invention relates to a new and novel form of tractor in which either drive wheel may operate independently of the other.

It is the object of my invention to provide a tractor of the character indicated in which the drive wheels may be simultaneously operated or independently operated as the driver may require; in which the drive wheels may be operated as indicated in conjunction with a single steering wheel; and in which the mechanism provided for securing the desired results is simple in form, of few parts, and easily assembled and operated.

In the drawing:—

Fig. 3 is an enlarged plan view of the driving mechanism, partly in section.

Fig. 5 is an enlarged detail view of the brake band operating mechanism.

Fig. 6 is an enlarged detail view of the means for operating the brake band operating mechanism.

Figure 1:
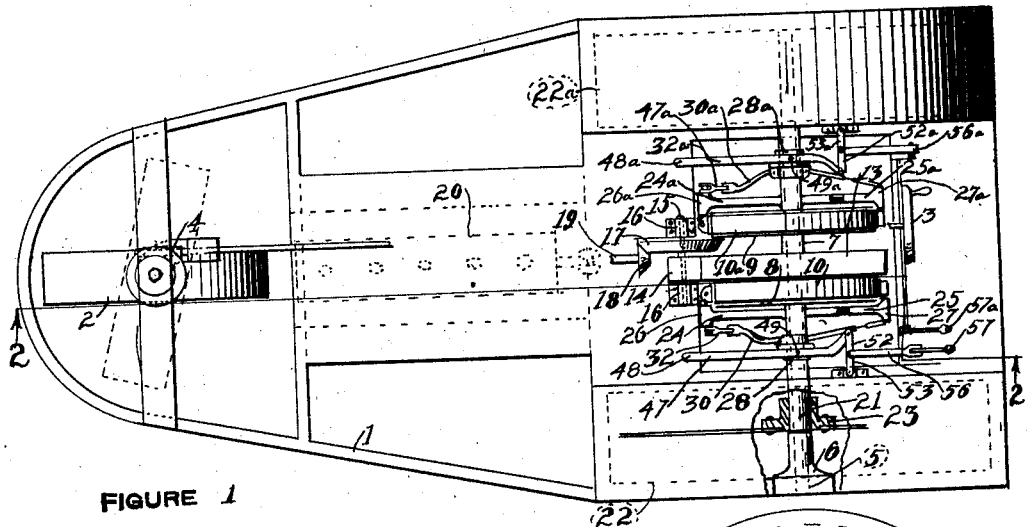
Figure 1 is a plan view of a tractor embodying my invention, partly in section.
Figure 2:
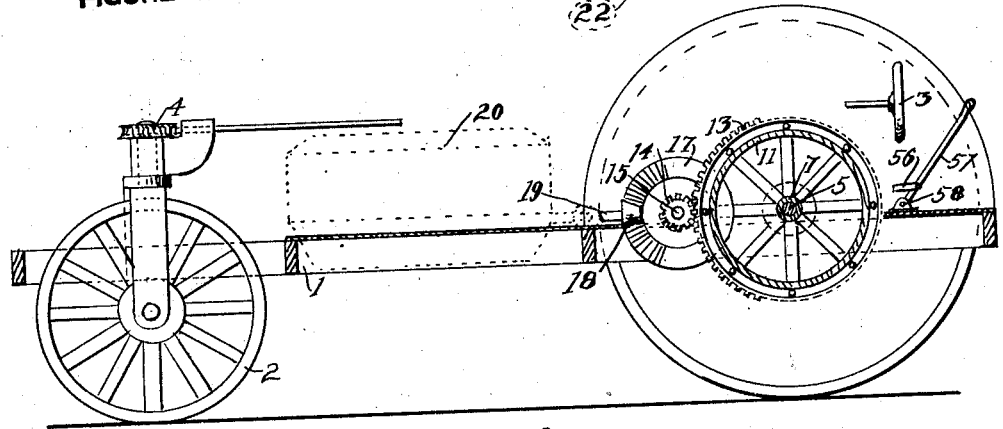
Fig. 2 is a section on 2—2 of Fig. 1.
Figure 4:
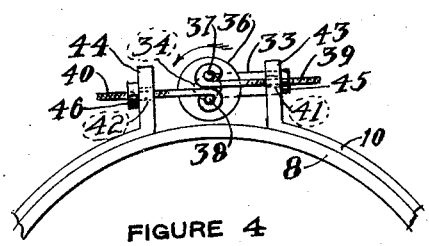
Fig. 4 is a section on 4—4 of Fig. 1.

Referring more particularly to the drawing, 1 indicates a suitable frame having a steering wheel 2 mounted on the front portion thereof controlled by handle 3 and gear connection 4. At 5 is shown a shaft revolubly mounted in bearings 6 in frame 1, and carrying a central sleeve 7 keyed thereto and provided with a pair of friction wheels 8 and 9 fitted with brake bands 10 and 10ᵃ respectively.

Wheel 8 is provided with a flange widened at 11 and carrying an outwardly extending flange 12 to which is bolted a spur gear 13. A spur gear 14 is shown mounted on shaft 15 in bearings 16 and in permanent mesh with gear 14. Shaft 15 also carries a bevel gear 17 in permanent mesh with a pinion 18 operated by driving shaft 19, the motor for operating the same being indicated at 20.

It is clear that in this construction the friction wheels 8 and 9 are driven simultaneously at equal speeds in the same direction. Since the mechanisms operated by the two wheels 8 and 9 are identical in construction and operation but one will be described in detail and the other designated by similar numerals followed by an appropriate letter.

Revolubly mounted on shaft 5 adjoining central sleeve 7 is a sleeve 21 carrying wheel 22 through the medium of flanged collar 23 bolted thereto. Sleeve 21 carries arms 24—25 at its inner end and extending in opposite directions adjacent wheel 8 and terminating in heads 26—27. Slidably mounted on sleeve 21 is a collar 28 revolving therewith through the medium of key 29. Collar 28 carries an arm 30 pivoted thereto at 31 and pivoted at its upper end to a link 32 which in turn is pivotally connected to arm 33 of crank 34 the latter being revolubly mounted in bearing 35 in head 26. Crank 34 carries a disk 36 at right angles to its axis, the disk 36 being provided with pins 37—38 on its outer surface, and each pin having a rod as 39—40 pivotally connected thereto as shown, these rods 39—40 passing through holes 41—42 in flanges 43—44 in the ends of brake band 10 and threaded to engage nuts 45—46 whereby the said rods 39—40 may always be placed under tension and any looseness due to wear be taken up.

By means of this mechanism the revolving of disk 36 in one direction will tighten band 10 on wheel 8 and revolving the same in the opposite direction will loosen the band. Likewise the sliding of collar 28 inwardly will, through the medium of parts 30—32—33—34 revolve the disk 36 in the direction indicated by the arrow to tighten band 10 on wheel 8, and sliding collar 28 outwardly will have the opposite effect.

To slide collar 28 I provide an arm 47 pivoted to frame 1 at 48 and to collar 28 at 49, pin 49 being set in collar 49ˣ positioned in groove 49ʸ in collar 28. Secured to the outer end of arm 47 is a laterally extending arm 50 to which is pivotally connected at 51 a link 52. A second link 53 is pivotally connected to frame 1 at 54 and to link 52 at 55. A third link 56 is pivotally connected to links 52 and 53 at 55 at one end and the other end being pivotally connected to lever 57 pivotally mounted on frame 1 at 58. By throwing lever 57 backwardly the collar 28 is moved inwardly to secure the result described and by throwing the lever 57 forwardly the parts 47—50—52—53—56 are moved into the positions indicated in dotted lines and the collar 28 is caused to slide outwardly whereby the band 10 is loosened on wheel 8 as described.

The arm 25 is provided with a sliding joint at 54 whereby to permit the sliding of collar 28, the head 27 being connected to band 10 as at 60 to prevent slipping of the same on wheel 8.

When the motor is in operation the central sleeve 7 and the friction wheels 8 and 9 are positively driven by driving shaft 18 and gear connections 13—14—17—18 thereto. Both levers 57—57ª being thrown forwardly no movement is imparted to drive wheels 22—22ª. For ordinary operation of the tractor both levers 57—57ª are thrown back thereby tightening both bands 10—10ª on their respective wheels 8 and 9 thereby through the connections between bands 10 and 10ª and sleeves 21—21ª simultaneously driving wheels 22—22ª at the same rate of speed in the same direction.

The usual steering of the tractor along substantially straight lines or in wide circles is effected in the usual way by steering wheel 2. But if it is desired to make a short turn to the left, for instance, as around the end of a row of trees, then the lever 57 is thrown forwardly to release band 10 on wheel 8 so that no power is transmitted to wheel 22 but the full amount of power is transmitted to wheel 22ª causing the same to travel around wheel 22 as a pivot, the steering wheel 2 being positioned as shown in dotted lines. It is of course obvious that either drive wheel may thus be thrown into or out of operation at the will of the driver, or any desired amount of power may be applied to either drive wheel to effect the desired turn, the steering wheel 2 being manipulated accordingly.

This construction provides a positive means of effecting the desired result and is extremely simple in construction and operation, the only gearing required being pinion 18 and the three gears 13—14—17 in easily accessible positions.

It is to be understood, of course, that changes in form, construction and method of operation may be made within the scope of the appended claims.

I claim:

1. A tractor including a frame, a bearing shaft mounted thereon, a revoluble double friction wheel centrally mounted on said shaft, means for actuating the same, a sleeve revolubly mounted on each end of said shaft, a drive wheel mounted on each sleeve, a pair of brake bands mounted on said friction wheel, a supporting arm mounted on each revoluble sleeve to revolve therewith and extending outwardly to a point adjacent the ends of said brake bands, and means operatively mounted on each arm and slidably mounted on said revoluble sleeves to revolve therewith for operating said brake bands, independently of each other.

2. A tractor including a frame, a bearing shaft mounted to revolve thereon, a sleeve centrally mounted on said shaft to revolve therewith, a pair of spaced parallel friction wheels mounted on said sleeve to revolve therewith, a sleeve revolubly mounted on each end of said bearing shaft, a drive wheel fixedly mounted on each revoluble sleeve, a brake band mounted on each friction wheel, a supporting arm mounted on each revoluble sleeve to revolve therewith and extending outwardly to a point adjacent the ends of said brake bands, means operatively mounted on each arm and slidably mounted on said revoluble sleeves to revolve therewith for operating said brake bands, and means for actuating both of said friction wheels in the same direction.

3. A tractor including a frame, a bearing shaft mounted to revolve thereon, a sleeve centrally mounted on said shaft to revolve therewith, a pair of spaced parallel friction wheels mounted on said sleeve to revolve therewith, a sleeve revolubly mounted on each end of said bearing shaft, a drive wheel fixedly mounted on each revoluble sleeve, a brake band mounted on each friction wheel, a supporting arm mounted on each revoluble sleeve to revolve therewith and extending outwardly to a point adjacent the ends of said brake bands, means mounted in each arm to operate said brake bands, a laterally extending arm carried by each of said last mentioned means, a link attached to each arm, a second arm pivotally connected to each link, a sleeve slidably mounted on each revolving sleeve to revolve therewith, a pivotal connection between each sleeve and said second arm, means for operating each slidable sleeve on its respective revolving sleeve, and means for actuating both of said friction wheels in the same direction.

4. A tractor including a frame, a bearing shaft mounted to revolve thereon, a sleeve centrally mounted on said shaft to revolve therewith, a pair of spaced parallel friction wheels mounted on said sleeve to revolve therewith, a sleeve revolubly mounted on each end of said bearing shaft, a drive wheel fixedly mounted on each revoluble sleeve, a brake band mounted on each friction wheel, means slidably mounted on each revolubly mounted sleeve to revolve therewith for operating said brake bands, an arm pivotally mounted on the tractor frame and pivotally connected to each slidable means, a link pivotally connected to the free end of said arm, a link pivotally connected to said frame and to said last mentioned link, a lever actuated arm pivotally connected to the pivotal connection between said links, and means for actuating both of said friction wheels in the same direction.

ANGELO G. CRIBARI.